Aug. 22, 1950     W. J. OESTERLEIN     2,519,784
WELDING TRANSFORMER
Filed Nov. 2, 1946     3 Sheets-Sheet 1
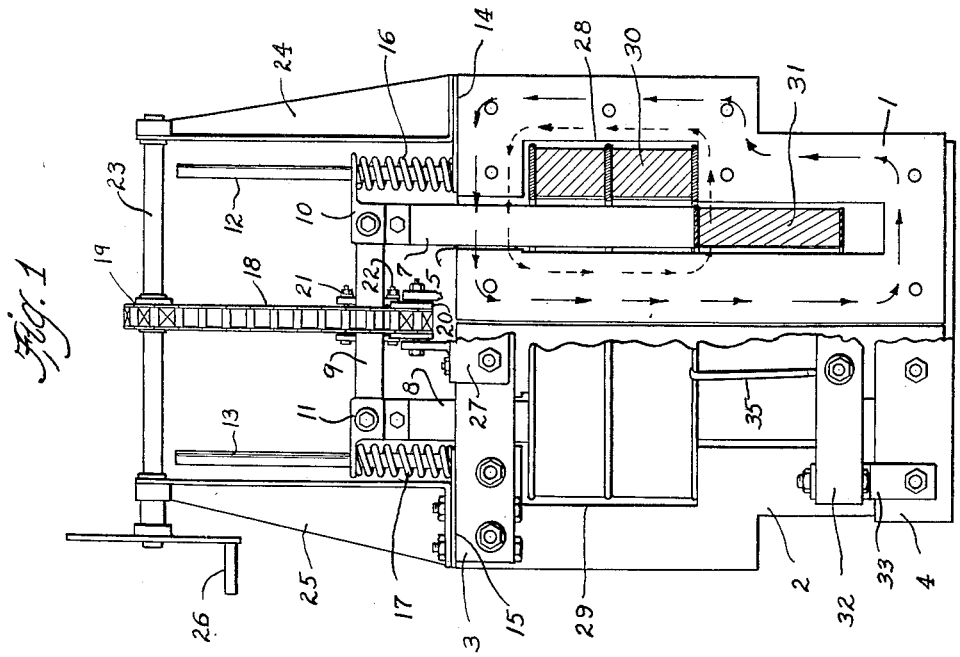
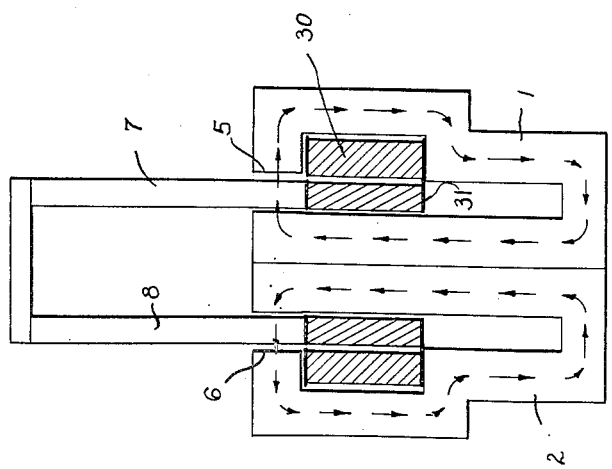
INVENTOR
William J. Oesterlein
BY
David A. Fox
ATTORNEY

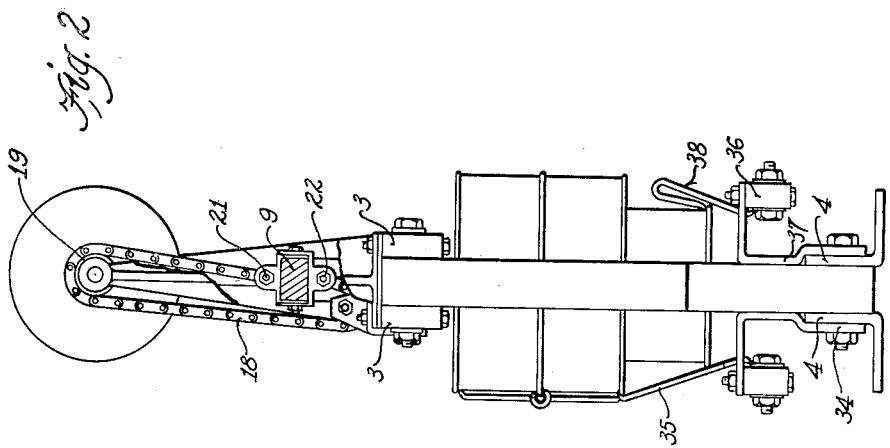
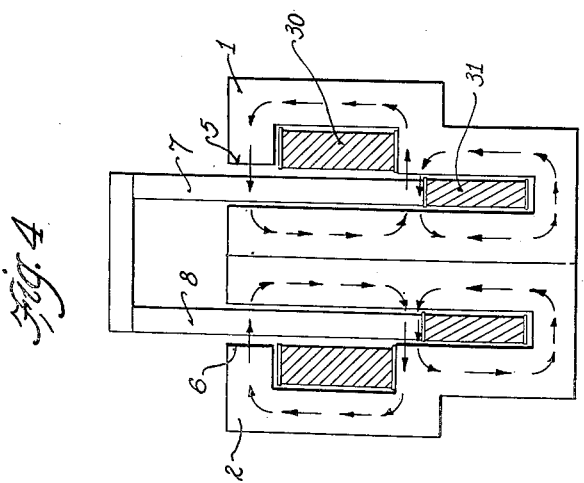

Aug. 22, 1950 W. J. OESTERLEIN 2,519,784
WELDING TRANSFORMER
Filed Nov. 2, 1946 3 Sheets-Sheet 3
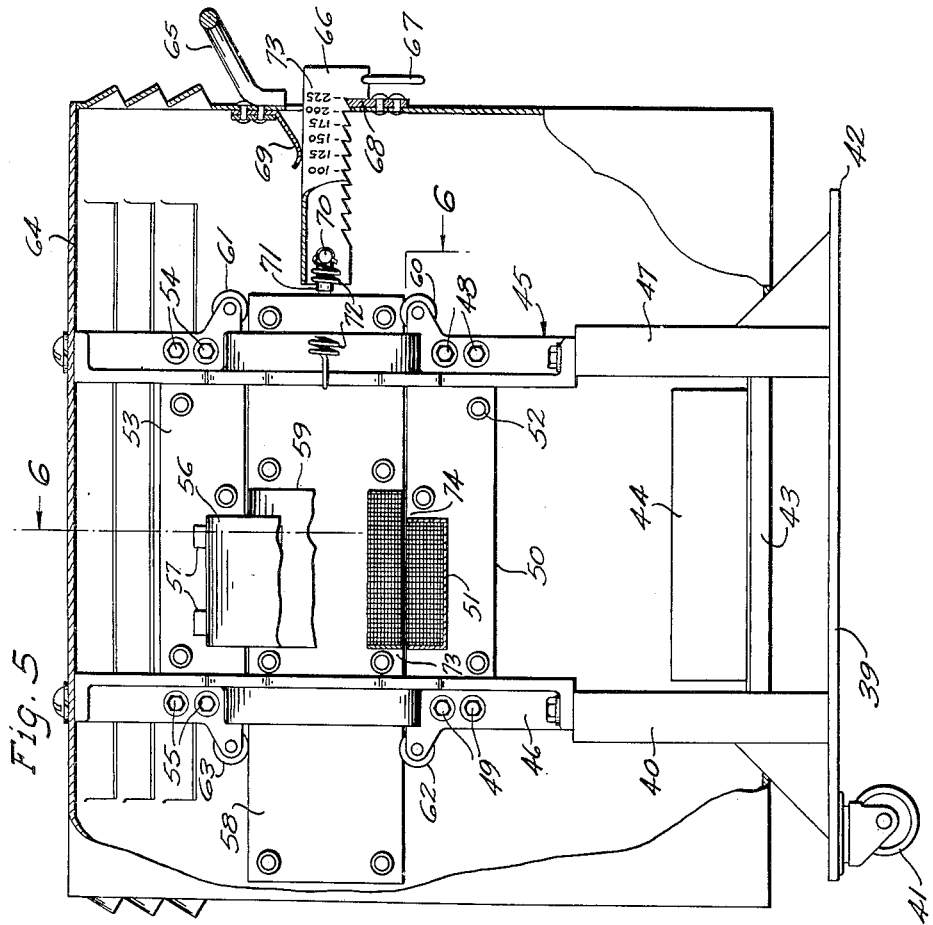
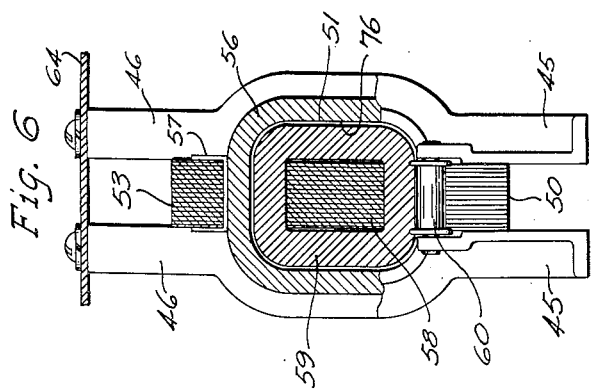
INVENTOR.
William J. Oesterlein
BY David A. Fox
Attorney Patented Aug. 22, 1950

2,519,784

UNITED STATES PATENT OFFICE 2,519,784

WELDING TRANSFORMER

William J. Oesterlein, Wauwatosa, Wis., assignor to Harnischfeger Corporation, Milwaukee, Wis., a corporation of Wisconsin Application November 2, 1946, Serial No. 707,473

3 Claims. (Cl. 171—119)

This invention relates to transformers adapted to supply a regulatable output of alternating current suitable for arc welding and it resides more specifically in an improved form of such apparatus in which primary and secondary windings are relatively movable with respect to one another and in which parts of the transformer frame are relatively movable with respect to one another in company with movement of the windings so as to bring about a marked alternation in the coupling between the windings with a relatively small movement of movable parts.

In a transformer of the type suitable for supplying regulated alternating current output suitable for electric arc welding it has heretofore been common to provide a transformer frame of sufficient length to permit primary and secondary windings to be adjustably separated to such an extent that flux leakage in substantial amount can pass between the separated windings. In this way coupling and current output are progressively restricted as the windings are separated. The regulation thus produced is satisfactory for most ordinary uses but in order to accomplish the same a very substantial adjusting movement is required and the apparatus as a whole is of large external dimensions so as to permit the large separation of windings required.

Through the use of the apparatus of this invention the movable parts need be moved but a small fraction of the distance heretofore considered necessary in order to vary the output of the transformer throughout its complete range of adjustability. At the same time the overall dimensions of the apparatus may be markedly reduced permitting a more compact and economical construction. In use, greatly increased convenience results, since an operator desiring to change the output being utilized, need shift a regulating member but a short distance, in contrast with the numerous turns heretofore necessary with the usual screw regulator in apparatus requiring a large amount of travel in the regulating mechanism.

This invention is herein described by reference to the accompanying drawings forming a part hereof in which there is set forth by way of illustration and not of limitation forms in which the apparatus of this invention may be embodied.

In the drawings:

Fig. 1 is a front view in elevation with parts broken away and in section of one form of the apparatus of this invention;

Fig. 2 is a side view in elevation with parts broken away and in section of the apparatus shown in Fig. 1;

Fig. 3 is a diagrammatic showing of the transformer frame and windings of the apparatus of Fig. 1, shown in the position of adjustment at which maximum output is obtained;

Fig. 4 is a diagrammatic showing of the transformer frame and windings of the apparatus of Fig. 1 shown in the position of adjustment in which output is at a minimum;

Fig. 5 is a side view with parts broken away of another form of the apparatus of this invention; and Fig. 6 is an end view partly in section of a part of the apparatus shown in Fig. 5, viewed through the broken plane 6—6 there indicated.

As shown in Figs. 1 to 4 the transformer of this invention may include a stationary frame member, made up for convenience from two built-up, laminated, P-shaped members 1 and 2 placed back to back and rigidly assembled between upper clamp pieces 3—3 and lower clamp pieces 4—4. The frame members 1 and 2 each are provided with gaps 5 and 6 respectively in the upper portions thereof, as shown, through which movable regulating tongues 7 and 8 built up of laminated material are admitted.

The tongues 7 and 8 are securely clamped to a cross bar 9 by means of end brackets 10 and 11 which have laterally extending guiding ears with openings therein slidingly received upon guide rods 12 and 13. The guide rods 12 and 13 are in turn rigidly mounted upon base members 14 and 15 bolted rigidly in place upon the clamp pieces 3. Interposed between the ears of brackets 10 and 11 on the one hand and the base members 14 and 15 on the other hand are counter-balancing springs 16 and 17 so proportioned as to sustain a substantial part of the weight of the tongues 7 and 8 and associated parts in any adjusted position of vertical movement.

To provide convenient means for regulating the position of adjustment of the tongues 7 and 8 a sprocket chain 18 mounted in running engagement with a sprocket 19, and sprocket 20 is secured at its ends by means of bolts 21 and 22 to the cross member 9. Sprocket 19 is secured to a supporting shaft 23 journalled for rotation in end stands 24 and 25 secured above the base members 14 and 15 by bolts passing through clamp members 3 as shown. Secured to the end of shaft 23 is a hand crank 26 by means of which adjusting movement may be accomplished. Sprocket 20 is mounted for rotation in a bracket 27 secured to one of the clamp members 3 as shown.

As appears clearly in the drawings the frame members 1 and 2 are laterally offset to provide a bay 28 and 29 respectively for the accommodation of a winding 30 which preferably is the secondary winding of the transformer, the same being of sufficient internal diameter as to provide complete clearance for downward passage of the tongue 7 and 8 and a primary winding 31 rigidly attached by means not shown to the lower ends of said tongues 7 and 8 so as to move in company therewith. An insulated terminal support 32 secured by bracket 33 and 34 upon the clamp piece 4 receives the terminal leads of the secondary winding 30, one of which is shown at 35. A similar insulating terminal support 36 held on brackets 37 receives the flexible primary winding leads 38 as shown in Fig. 2.

As shown in Fig. 3 when the tongue members 7 and 8 and associated winding 31 are in raised position the flux path indicated by the arrows completely embraces both windings so as to produce a maximum coupling effect. In this position the transformer is capable of its maximum output. As shown more clearly in Fig. 1 when the tongues 7 and 8 and associated winding 31 are positioned in a somewhat lower position the main flux path indicated by solid line arrows still embraces both windings but at the same time a substantial part of the flux, as indicated by the dotted line arrows, is free to leak through the bridge provided by the tongues 7 and 8 in such a way as to independently enclose the transformer windings. In this way the coupling between the windings 30 and 31 is diminished and the transformer is capable of a lower output. The output progressively is reduced as the apparatus is moved from the position shown in Fig. 3 toward and through the position shown in Fig. 1 until the position indicated in Fig. 4 is assumed.

When the apparatus assumes the position indicated in Fig. 4 completely independent flux paths as indicated by the arrows are provided surrounding the windings 30 and 31. In this position the output of the transformer due to the near absence of coupling of the windings 30 and 31 is reduced to a minimum. From this it may be observed that movement of the coil 31 over a distance only slightly greater than its own height is sufficient to bring about a change in regulation from maximum output to minimum output.

If desired, the stationary parts of the transformer frame may be made up as a single integral piece. It is preferred that it be divided, since it is possible to make up the members 1 and 2 complete in advance of the insertion of the winding 30 which may be dropped through the gaps 5 and 6 and then brought to the position shown by moving the members 1 and 2 toward each other ready for assembly with clamp members 3 and 4.

It will appear from inspection that either the frame member 1 together with its adjustable leg 7 of the frame member 2 with its adjustable leg 8 constitutes a complete flux controlling circuit which might be used alone. Not only may such units be used alone or in pairs as shown but also in any greater number, such as 3 or 4, which space limitations will permit. In any such arrangement the advantageous principle of inductively related relatively movable windings disposed within a frame forming a flux path and with a movable frame member which follows the movable winding to provide for a maximum rate of increase of flux diversion is still preserved.

In another form the apparatus of this invention may be constructed as shown in Figs. 5 and 6. This form of the apparatus is mounted upon a portable frame made up of a base 39 and uprights 40 and 47. The base 39 is provided with a pair of supporting casters at one end, one of which is shown at 41. When at rest the base 39 is disposed in an inclined position bearing upon the casters 41 and the end 42 of the base 39. The frame also is provided with a shelf 43 upon which power factor correcting condensers 44 may be carried.

Secured to the upright 47 and extending upwardly therefrom is a pair of stationary non-magnetic core clamps 45 and in similar manner a pair of stationary non-magnetic core clamps 46 is secured to and extends upwardly from the upright 40. Held between the clamps 45 at one end by the bolts 48 and at the opposite end between the clamps 46 by the bolts 49 is a laminated stationary core piece 50 having an upwardly facing notch 51. The laminations of the core piece 50 are additionally secured as a unitary body by means of rivets, one of which is designated 52. A similar stationary core piece 53, spaced from, parallel to and disposed above the core piece 50, is held between the stationary core clamps 45 and 46 by bolts 54 and 55, respectively. The core piece 53 has a downwardly facing notch corresponding to the notch 51 in core piece 50 and within these notches a transformer winding 56 is received. The winding 56 is furnished with attached locating tabs 57 which are bent into the position shown during assembly for the purpose of holding the winding 56 in place.

Winding 56 as appears more clearly in Fig. 6 has a large central opening at 76, sufficient to admit a movable laminated core piece 58 which substantially bridges the space between stationary core pieces 50 and 53 except for very small air gaps as shown. The core piece 58 is notched as shown to carry a winding 59 disposed as shown to pass freely through the opening 76 in the winding 56. In order to positively guide the core piece 58 in its movement and to reduce friction, rollers 60 and 61 are pivotally mounted in ears formed as integral extensions of the core clamps 45, and similar rollers 62 and 63 are pivotally mounted on the clamps 46. The rollers 60—61 and 62—63 are preferably spaced vertically a distance slightly less than the vertical height of the core piece 58, and are shod with stiff rubber or other like resilient material so as to be under stress at all times and thus diminish noise which might otherwise occur.

A ventilated housing 64 is hung as shrown from upward extensions of the clamps 45 and 46 and bears a rigidly attached hand grip 65 by means of which an operator may lift the end 42 of the base 39 from the floor to permit the apparatus to be rolled about on the casters 41. Directly below the hand grip 65 is an aperture in the housing 64 through which the end of a notched adjusting channel 66 projects. Pivotally attached to the channel 66 is a swinging adjusting bail 67 by which the operator may lift the outer end of the channel 66 from a striking plate 68 against the action of a flat retaining spring 69 both mounted as shown. To permit the lifting of the outer end of the channel 66 the inner end of the same is pivotally attached through a pin 70 to a stud 71 secured in the end of the movable core piece 58. Pin 70 is made of such length as to extend a substantial distance laterally beyond the sides of channel 66 to provide means for attachment of the outer ends of a pair of returning tension springs one of which is shown in fragmentary form and designated 72 in Fig. 5. The opposite ends of springs 72 are secured as shown to the clamp members 45. To guide the user, an indicating scale 73, calibrated in terms of output of the apparatus in various adjusted positions, may be marked on a face of the channel 66 as shown.

In use the windings 56 and 59 are connected by leads not shown with an alternating current power source and with work elements of an output circuit in known manner. The operator then shifts the channel 66 and with it the movable core 58 to that position in which the desired output is attained. As the movable core 58 is shifted from the position in which it is shown, toward the right, the notches in the stationary and movable core members move farther away from registry and the leakage flux path is progressively augmented. When the movable core 58 is in extreme right hand position, corner 75 of the movable core is in close proximity to corner 74 of the stationary core so that nearly independent flux paths for each of the windings are provided and coupling is reduced to a minimum. The complete range of adjustment is therefore obtained with a comparatively small movement as contrasted with transformers in which adjustment is obtained by coil movement only.

I claim:

1. In a variable output transformer the combination comprising a pair of spaced magnetic stationary field members, clamping means for maintaining the spaced relationship of said field members, each of said field members having a notch on the inner face thereof, a stationary winding received within said notches and having an open center, a movable magnetic core dimensioned to closely fit and rectilinearly move in the space between said field members and through the open center of said stationary winding, said core having notches thereon for receiving a movable winding, a movable winding dimensioned to pass through the open center of said stationary winding mounted on and fixed with respect to said core notches, and means for adjustably moving said core and associated movable winding from a position in which said movable winding is opposite said stationary winding to a position where it is adjacent thereto.

2. In a variable output transformer the combination comprising a pair of spaced elongated parallel stationary magnetic field members, non-magnetic clamping means engaging the ends of said stationary field members adapted to maintain the spaced relationship thereof, each of said field members having a notch on the inner face thereof oppositely positioned with respect to one another, a stationary winding received within said notches and having an open center of transverse dimension not less than the spacing between said stationary field members, a parallel sided movable magnetic core adapted to bridge the space between said stationary frame members and to move rectilinearly through the opening in said stationary coil in the direction of the length of said stationary frame members disposed between said frame members, said core having oppositely positioned notches in the side faces thereof adjacent the inner faces of said stationary frame members said notches being adapted to receive a coil movable with said core, a movable coil positioned in and fixed with respect to said notches dimensioned to enter the central opening in said stationary coil, and means adapted to move said core from a position in which said movable coil is within said stationary coil toward a position where it is outside of the same.

3. In a variable output transformer the combination comprising a pair of spaced parallel stationary field members, non-magnetic clamping means at the ends thereof secured thereto and adapted to rigidly maintain the spacing therebetween, a rectilinearly movable central magnetic core of length exceeding said stationary field members disposed for lengthwise movement between the same and transversely dimensioned to substantially span the space between said stationary members, said movable core member having notches therein adapted to receive a movable coil, a movable coil disposed in and fixed with respect to the notches in said movable core, said stationary field members each having an inwardly facing notch adapted to receive a stationary coil, a stationary coil surrounding said movable core and winding assembly disposed in the notches in said stationary field members, a pair of oppositely disposed resilient rollers secured to the clamping means at each end of said stationary field members and adapted to bear upon the side surfaces of said movable core to guide the same for movement without contact with said stationary field members, and means for altering the position of said movable core.

WILLIAM J. OESTERLEIN.

REFERENCES CITED

The following references are of record in the file of this patent:

UNITED STATES PATENTS

| Number | Name | Date |
| --- | --- | --- |
| 890,638 | Gehrkens | June 16, 1908 |
| 1,478,579 | Reynolds | Dec. 25, 1923 |
| 1,684,746 | Smith et al. | Sept. 18, 1928 |
| 1,873,354 | Stewart | Aug. 23, 1932 |
| 1,942,481 | Lobl | Jan. 9, 1934 |
| 2,270,178 | Weis et al. | Jan. 13, 1942 |